US010540463B1

(12) United States Patent
Chandrasekar et al.

(10) Patent No.: US 10,540,463 B1
(45) Date of Patent: Jan. 21, 2020

(54) PLACEMENT OF DELAY CIRCUITS FOR AVOIDING HOLD VIOLATIONS

(71) Applicant: Xilinx, Inc., San Jose, CA (US)

(72) Inventors: Maheshwar Chandrasekar, Sunnyvale, CA (US); Sabyasachi Das, San Jose, CA (US)

(73) Assignee: XILINX, INC., San Jose, CA (US)

( * ) Notice: Subject to any disclaimer, the term of this patent is extended or adjusted under 35 U.S.C. 154(b) by 74 days.

(21) Appl. No.: 15/895,737

(22) Filed: Feb. 13, 2018

(51) Int. Cl.
*G06F 17/50* (2006.01)
*H03K 19/177* (2006.01)
*H01L 21/822* (2006.01)

(52) U.S. Cl.
CPC ........ *G06F 17/5031* (2013.01); *G06F 17/505* (2013.01); *G06F 17/5054* (2013.01); *G06F 17/5077* (2013.01); *H01L 21/822* (2013.01); *H03K 19/177* (2013.01); *G06F 2217/04* (2013.01)

(58) Field of Classification Search
CPC ............. G06F 17/5031; G06F 17/5054; G06F 17/505; G06F 17/5077; G06F 2217/04; H03K 19/177; H01L 21/822
See application file for complete search history.

(56) References Cited

U.S. PATENT DOCUMENTS

| | | | |
|---|---|---|---|
| 6,167,001 A | 12/2000 | Wu | |
| 6,239,611 B1 | 5/2001 | Matera | |
| 6,480,991 B1 * | 11/2002 | Cho | G06F 17/5072 716/122 |
| 6,505,330 B1 * | 1/2003 | Osborn | G06F 17/5072 716/113 |
| 6,734,703 B1 | 5/2004 | Alfke et al. | |
| 6,870,397 B1 | 3/2005 | Fox et al. | |
| 7,020,862 B1 | 3/2006 | Alfke et al. | |
| 7,257,795 B1 * | 8/2007 | Fung | G06F 17/5054 716/113 |

(Continued)

OTHER PUBLICATIONS

Altera, "Timing Closure and Optimization," Quartus II Handbook (QII2005-13.1.0), version 13.1, Nov. 2013, pp. 12-1 to 12-46, Altera Corporation, now Intel Corporation, Santa Clara, California, USA.
Altera, "Netlist Optimization and Physical Synthesis," Quartus II Handbook (QII52007-13.1.0), version 13.1, Nov. 2013, pp. 16-1 to 16-16, Altera Corporation, now Intel Corporation, Santa Clara, California, USA.

(Continued)

*Primary Examiner* — Naum Levin
(74) *Attorney, Agent, or Firm* — LeRoy D. Maunu

(57) ABSTRACT

Disclosed approaches for processing a circuit design include identifying a driver and a load having a hold violation in the circuit design. The circuit design is targeted to an integrated circuit (IC) die. The method determines a first offset from a location on a perimeter of a rectangular region of the IC die having corners at locations of the driver and the load such that a length of a signal path from the driver through a first candidate location having placement coordinates that are outside the rectangular region and at the first offset from the location on the perimeter resolves the hold violation. The method determines availability of the first candidate location. In response to determining that the first candidate location is available, the method includes instantiating a delay circuit at the first candidate location and specifying connections that connect the delay circuit between the driver and the load.

20 Claims, 6 Drawing Sheets

(56) References Cited

U.S. PATENT DOCUMENTS

| | | | |
|---|---|---|---|
| 7,312,631 B1 | 12/2007 | Bauer et al. | |
| 7,512,919 B2 * | 3/2009 | Visweswariah | G06F 17/5031 716/106 |
| 7,548,089 B1 | 6/2009 | Bauer et al. | |
| 7,653,884 B2 * | 1/2010 | Furnish | G06F 17/5068 716/103 |
| 7,701,255 B2 * | 4/2010 | Cortadella | H03K 19/20 326/93 |
| 7,814,451 B2 * | 10/2010 | Furnish | G06F 17/5068 716/100 |
| 8,713,501 B1 * | 4/2014 | Le | G06F 17/5045 716/113 |
| 8,839,173 B1 * | 9/2014 | Jiang | G06F 17/505 716/111 |
| 8,898,608 B1 * | 11/2014 | Chuang | G06F 17/5072 716/113 |
| 9,805,155 B2 * | 10/2017 | Lu | G06F 17/5072 |
| 2013/0167096 A1 * | 6/2013 | Fennell | G06F 17/5031 716/108 |
| 2018/0278253 A1 * | 9/2018 | Lu | H03K 5/135 |

OTHER PUBLICATIONS

Han, Inhak et al., "Buffer Insertion to Remove Hold Violations at Multiple Process Corners," Proc. of the 2016 21st Asia and South Pacific Design Automation Conference, Jan. 25, 2016, pp. 232-237, IEEE, Piscataway, New Jersey, USA.
Synopsys, "Synplify Premier" brochure, copyright 2011, pp. 1-4, Synopsys, Inc., Mountain View, California, USA.
Wikipedia, "Taxicab geometry," Sep. 25, 2017, pp. 1-4, https://en.wikipedia.org/wiki/Taxicab_geometry.
Wu, Pei-Ci et al., "On Timing Closure: Buffer Insertion for Hold-Violation Removal," Proc. of the 2014 Design Automation Conference, Jun. 1, 2014, pp. 1-6, IEEE, Piscataway, New Jersey, USA.
Zhang, Yanqing et al., "Hold Time Closure for Subthreshold Circuits Using a Two-Phase, Latch Based Timing Method," Proc. of the 2013 IEEE SOI-3D-Subthreshold Microelectronics Technology Unified Conference, Oct. 7, 2013, pp. 1-2, IEEE, Piscataway, New Jersey, USA.

* cited by examiner

US 10,540,463 B1

PLACEMENT OF DELAY CIRCUITS FOR AVOIDING HOLD VIOLATIONS

TECHNICAL FIELD

The disclosure generally relates to optimizing timing in integrated circuit designs.

BACKGROUND

Designing circuits, such as those implemented on field programmable gate arrays (FPGAs), can be a complex process. For example, a user of the FPGA can have aggressive timing requirements for a FPGA circuit design. Meeting timing requirement(s) is one of the most challenging problems that circuit designers face. A lot of time and resources may be spent trying to resolve timing violations in circuit designs. As the complexity of circuit designs increase, new techniques for physical optimization of circuit designs are becoming increasingly important from timing perspective. Automated computer-aided design (CAD) implementation tools help circuit designers; however, automated place and route electronic design automation (EDA) solutions may be unable to resolve timing issues in the circuit design. As a result, circuit designers have to spend a lot of manual effort and time trying to close timing.

SUMMARY

A disclosed method includes identifying a driver and a load having a hold violation in the circuit design. The circuit design is targeted to an integrated circuit (IC) die. The method determines a first offset from a location on a perimeter of a rectangular region of the IC die having corners at locations of the driver and the load such that a length of a signal path from the driver through a first candidate location having placement coordinates that are outside the rectangular region and at the first offset from the location on the perimeter resolves the hold violation. The method determines availability of the first candidate location. In response to determining that the first candidate location is available, the method includes instantiating a delay circuit at the first candidate location in the circuit design and specifying connections that connect the delay circuit between the driver and the load in the circuit design.

A disclosed system includes a computing system including a processor and a memory coupled to the processor. The memory is configured with instructions that when executed by the processor cause the processor to perform operations including: identifying a driver and a load having a hold violation in a circuit design. The circuit design is targeted to an integrated circuit (IC) die. a first offset from a location on a perimeter of a rectangular region of the IC die having corners at locations of the driver and the load is determined such that a length of a signal path from the driver through a first candidate location having placement coordinates that are outside the rectangular region and at the first offset from the location on the perimeter resolves the hold violation. Availability of the first candidate location is determined. In response to determining that the first candidate location is available, a delay circuit is instantiated at the first candidate location in the circuit design and connections are specified that connect the delay circuit between the driver and the load in the circuit design.

Other features will be recognized from consideration of the Detailed Description and Claims, which follow.

BRIEF DESCRIPTION OF THE DRAWINGS

Various aspects and features of the disclosed circuitry will become apparent upon review of the following detailed description and upon reference to the drawings in which.

DETAILED DESCRIPTION

Figure 1:
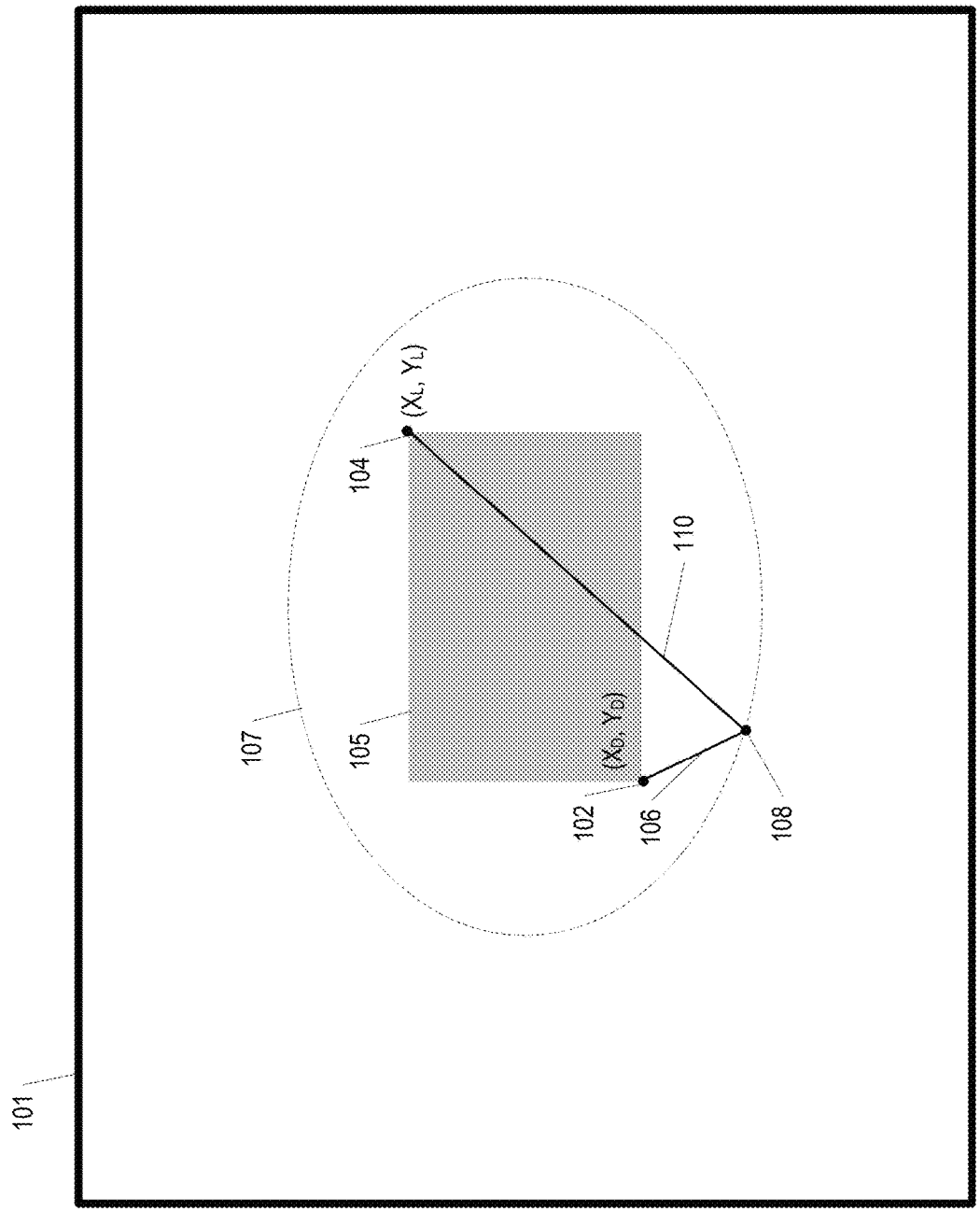
FIG. 1 illustrates a geometric representation of a driver and a load of an IC die.

In the following description, numerous specific details are set forth to describe specific examples presented herein. It should be apparent, however, to one skilled in the art, that one or more other examples and/or variations of these examples may be practiced without all the specific details given below. In other instances, well known features have not been described in detail so as not to obscure the description of the examples herein. For ease of illustration, the same reference numerals may be used in different diagrams to refer to the same elements or additional instances of the same element.

A hold violation on the path from a driver to a load of a circuit design may be resolved by increasing the path length and/or adding delay circuitry to the signal path. Hold time is the minimum amount of time the input data signal should be held steady after the clock event in order for the state of the data signal to be reliably captured. In prior approaches, preference was given to placing delay circuitry (e.g., buffers) on a signal net between a particular driver and load(s) and in proximity to the driver and/or load(s). However, such a placement may require several buffers to be placed on a single combinational path to resolve the hold violation, which may degrade both the quality of result (QoR) and runtime of the place and route tools. The disclosed approaches provide automated methods and systems that enable circuit designers to improve and/or close the timing of circuit designs, and/or improve the QoR of circuit designs. The disclosed methods and systems optimize timing of circuit designs in an opportunistic manner by determining candidate locations for a delay circuit such that the candidate locations may reduce the quantity of delay circuits needed to resolve a hold violation.

An electronic design automation (EDA) computer system can be programmed to identify a driver and a load having a hold violation in a circuit design targeted to an integrated circuit (IC) die. The EDA system determines an offset from a location on a perimeter of a rectangular region of the IC die having corners at locations of the driver and the load. The offset is determined such that a length of a signal path from the driver through a candidate location having placement coordinates that are outside the rectangular region and at the offset from the location on the perimeter resolves the hold violation. The EDA system determines the availability of the candidate location. In response to the determining that the candidate location is available, the system instantiates a delay circuit at the candidate location and specifies connections between the driver, the load, and the delay circuit.

FIG. 1 illustrates a geometric representation of a driver 102 and a load 104 of an IC die. The rectangle 101 illustrates a portion of the IC die. Driver 102 has placement coordinates ($X_D$, $Y_D$) and load 104 has placement coordinates ($X_L$, $Y_L$). Shaded rectangular region 105 of the IC die has corners at locations of driver 102 and load 104. In the example of FIG. 1, assume that a path from driver 102 to load 104 has a hold slack of −d (the negative value indicates a hold violation). In order to resolve this hold violation, a delay circuit needs to be placed on the signal net to induce a delay of at least d. The disclosed approaches use the delay d to determine candidate locations. In a strictly geometrical sense, for illustration purposes only, an ellipse 107 can be visualized where the sum of a distance 106 from driver 102 to any point on ellipse 107 (e.g., point 108) and a distance 110 from point 108 to load 104 will represent the delay d. In contrast to some previous approaches that involved placing one or more delay circuits proximate to the driver 102 or load 104, such as within rectangular region 105, a delay circuit can be thought as being placed on or outside of ellipse 107 such that a delay of at least d is induced.

Figure 2:
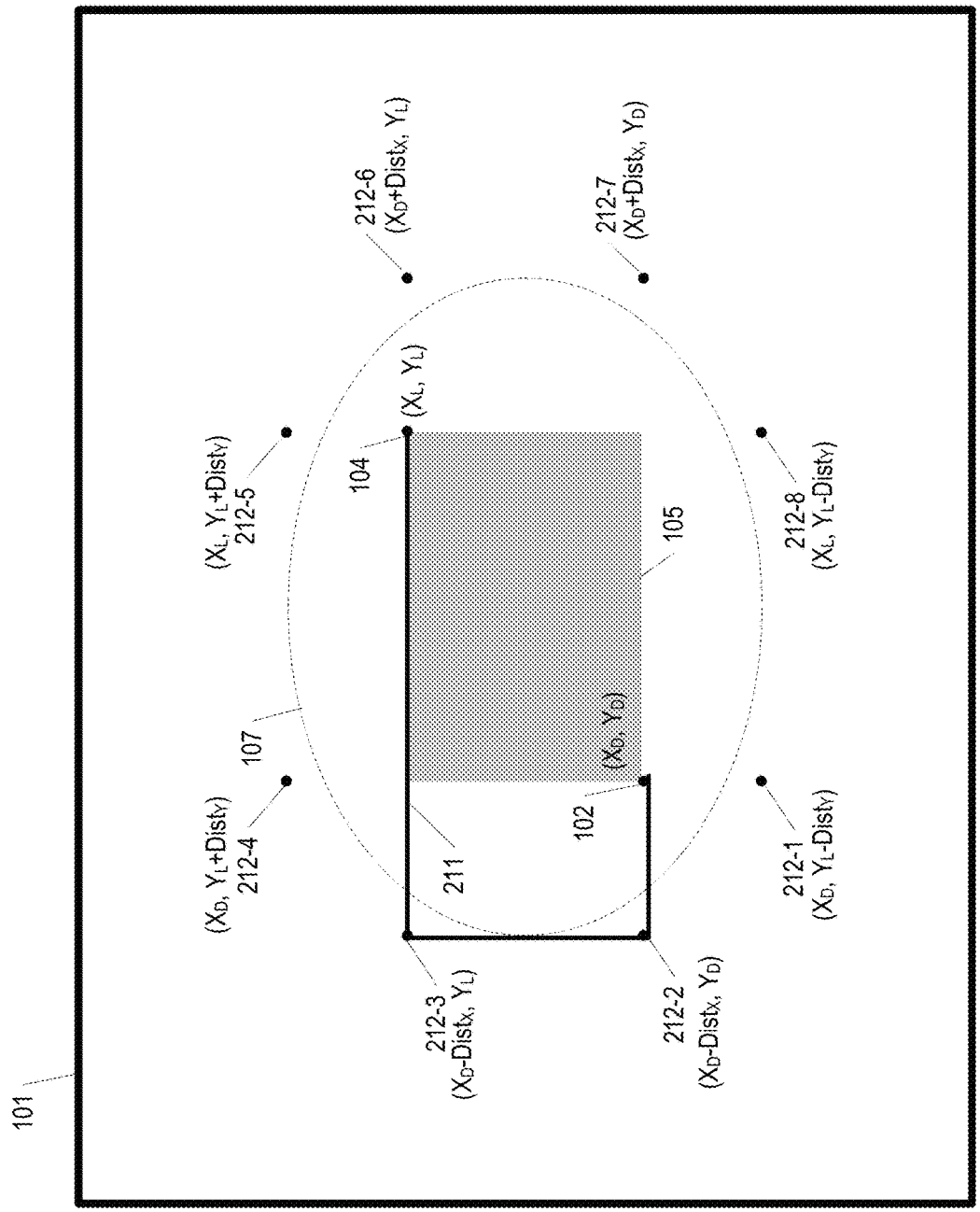
FIG. 2 illustrates a geometric representation of candidate locations for placing a delay circuit on an IC die.

FIG. 2 illustrates a geometric representation of candidate locations for placing a delay circuit on an IC die. Candidate locations can be selected for placement of a delay circuit such that each candidate location approximates a point on ellipse 107. Points on the ellipse can be approximated by x-y coordinates of permissible placement locations on the IC die. Although FIG. 2 illustrates eight candidate locations 212-1, 212-2, 212-3, 212-4, 212-5, 212-6, 212-7, and 212-8 (collectively referred to as candidate locations 212), any location on or outside ellipse 107 will induce at least the delay d. The length of a signal path (e.g., signal path 211) from a driver (e.g., driver 102) through a candidate location (e.g., candidate location 212-2) to a load (e.g., load 104) has placement coordinates that are outside rectangular region 105 and at the offset from the location on the perimeter of rectangular region 105. The length of the signal path (e.g., signal path 211) resolves the hold violation between driver 102 and load 104.

Candidate locations 212 are offset from the placement coordinates of driver 202 ($X_D$, $Y_D$) and load 204 ($X_L$, $Y_L$) by a vertical or a horizontal distance that induces at least the delay d. Because accurate timing information can be difficult to obtain during the design phase, a delay estimation for a unit step in the x- or y-direction (a unit delay) of the IC die can be used. The offset can be an offset along an x-axis from a corner of rectangular region 105 (a horizontal offset $Dist_X$) or an offset along a y-axis of placement coordinates from a corner of rectangular region 105 (a vertical offset $Dist_Y$). The horizontal offset $Dist_X$ and vertical offset $Dist_Y$ are based on the delay d and the unit delay in the x-direction or the y-direction, respectively. Determining the horizontal and/or vertical offset can include determining the offset such that a rectilinear length of the signal path from driver 102 through a candidate location to load 104 resolves the hold violation. In one implementation, the length of the signal path is such that a single delay circuit at the candidate location resolves the hold violation between driver 102 and load 104.

As shown in FIG. 2, candidate location 212-1 has placement coordinates ($X_D$, $Y_L$-$Dist_Y$), candidate location 212-2 has placement coordinates ($X_D$-$Dist_X$, $Y_D$), candidate location 212-3 has placement coordinates ($X_D$-$Dist_X$, $Y_L$), candidate location 212-4 has placement coordinates ($X_D$, $Y_L$+$Dist_Y$), candidate location 212-5 has placement coordinates ($X_L$, $Y_L$+$Dist_Y$), candidate location 212-6 has place- ment coordinates ($X_D$+$Dist_X$, $Y_L$), candidate location 212-7 has placement coordinates ($X_D$+$Dist_X$, $Y_D$), and candidate location 212-8 has placement coordinates ($X_L$, $Y_L$-$Dist_Y$).

In one implementation, the horizontal offset $Dist_X$ and vertical offset $Dist_Y$ are based on an offset factor f, the delay d, and the unit delay in the x-direction or the y-direction, respectively. For example, the horizontal offset $Dist_X$ can be described by:

$$Dist_X = f \frac{d}{u_X}$$

where $u_X$ is the unit delay in the x-direction. The vertical offset $Dist_Y$ can be described by:

$$Dist_Y = f \frac{d}{u_Y}$$

where $u_Y$ is the unit delay in the y-direction. In one implementation, an initial value of the offset factor f can be used to determine a first candidate location. If the first candidate location is unavailable (e.g., another circuit is already placed at the first candidate location), then the value of the offset factor f can be increased to determine a second candidate location as described below in association with FIG. 4. For example, the offset factor f can be increased in the following sequence until an available candidate location is identified: ½, ⅔, ¾, 1. In one implementation, a different offset factor may be used for the horizontal offset $Dist_X$ than the vertical offset $Dist_Y$.

Figure 3:
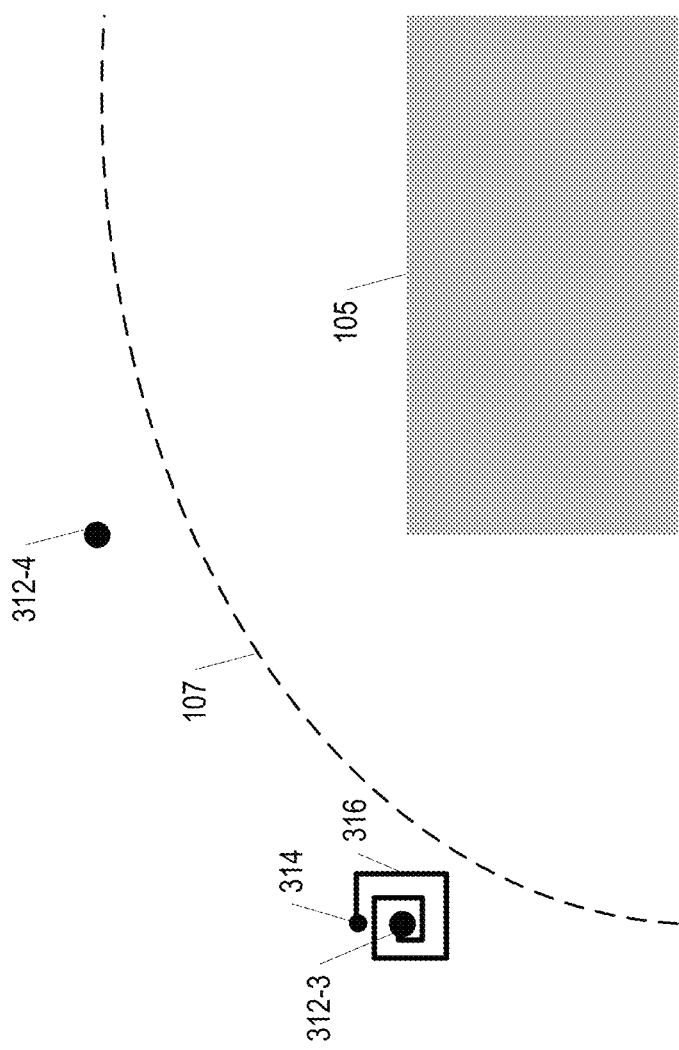
FIG. 3 illustrates a geometric representation of a spiral search for a candidate location.

FIG. 3 illustrates a portion of FIG. 2 and a spiral search for an available candidate location. In one implementation, in response to determining that a candidate location is unavailable, a spiral-in search relative to the unavailable candidate location can be performed. For example, if candidate location 312-3 is determined to be unavailable, then an offset from candidate location 312-3 is determined. A starting candidate location 314, having placement coordinates separated from candidate location 312-3 by the second offset, is selected. The availability of one or more spiral candidate locations having placement coordinates along rectilinear spiral path 316, beginning at starting candidate location 314 and ending at candidate location 312-3, is determined. In response to determining that one of the spiral candidate locations is available, the delay circuit is instantiated at the spiral candidate location.

In another implementation, in response to determining that a candidate location is unavailable, a spiral-out search from the candidate location can be performed. For example, if candidate location 312-3 is unavailable, then an offset from candidate location 312-3 is determined in the x, y, or a combination of x and y directions. The availability of one or more spiral candidate locations having placement coordinates along rectilinear spiral path 316 beginning at candidate location 312-3 is determined. In response to the determining that one of the spiral candidate locations is available, the delay circuit is instantiated at the spiral candidate location.

Figure 4:
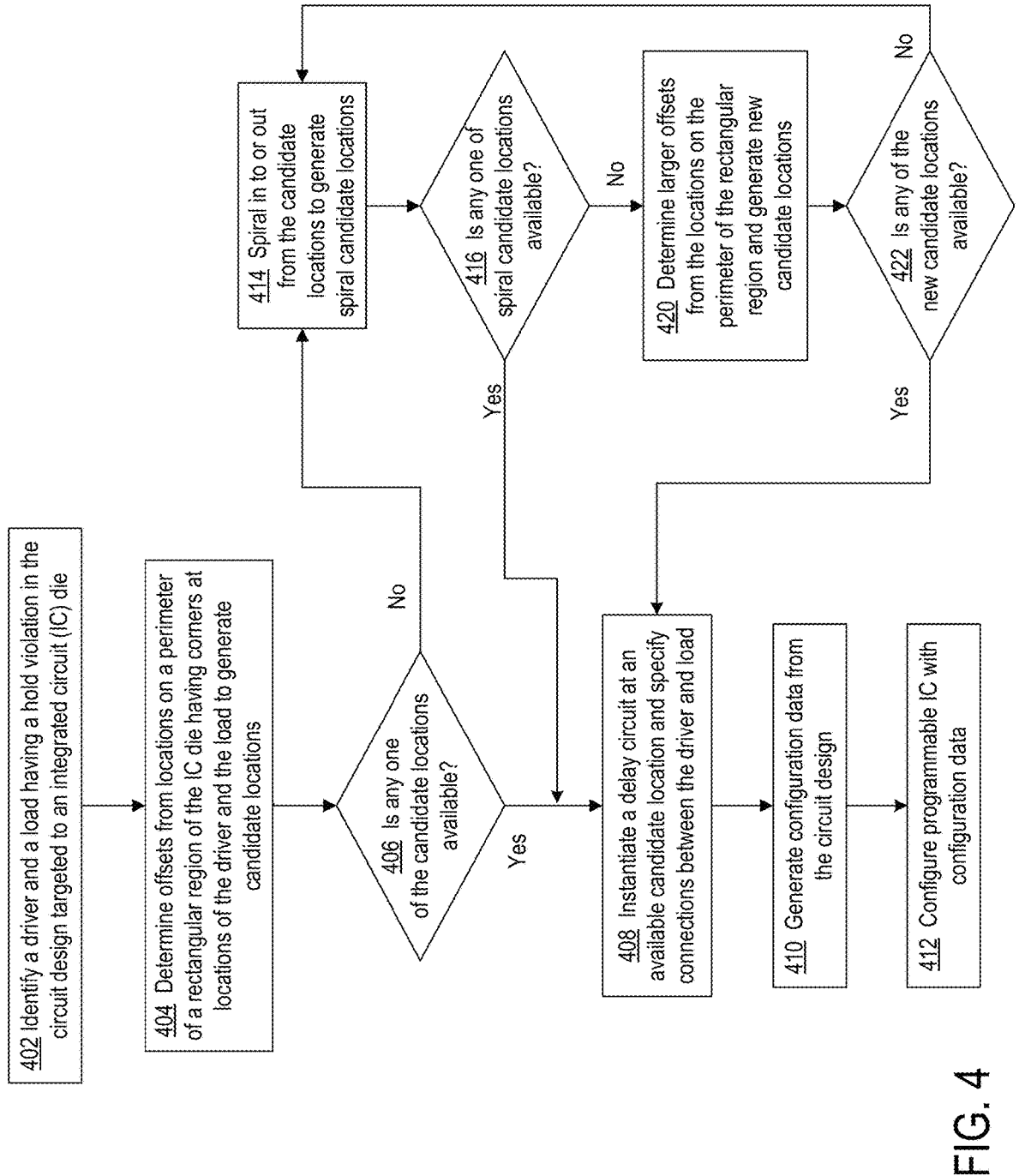
FIG. 4 illustrates a flowchart of an exemplary process for determining a candidate location of a delay circuit of a circuit design.

FIG. 4 illustrates a flowchart of an exemplary process for placing a delay circuit to fix a hold violation in a circuit design. At block 402, the system identifies a driver and a load having a hold violation in a circuit design targeted to an IC die. A hold violation can be determined using static timing analysis tools on a placed-and/or-routed circuit design. At block 404, the system determines offsets from locations on a perimeter of a rectangular region of the IC die having corners at the locations of the driver and the load to generate candidate locations. For example, the x-coordinate or the y-coordinate of the placement coordinates of four corners of rectangular region 105, $(X_D, Y_D)$, $(X_D, Y_L)$, $(X_L, Y_L)$, and $(X_L, Y_D)$, can be offset by the horizontal offset $Dist_X$ or vertical offset $Dist_Y$, respectively. That is, the horizontal offset $Dist_X$ or vertical offset $Dist_Y$ can be added to the x-coordinate or the y-coordinate, respectively, to generate candidate locations 212-4, 212-5, 212-6, and 212-7 and the horizontal offset $Dist_X$ or vertical offset $Dist_Y$ can be subtracted from the x-coordinate or the y-coordinate to generate candidate locations 212-1, 212-2, 212-3, and 212-8.

At block 406, the system determines whether or not any one of the candidate locations is available. For example, the placed-and/or-routed circuit design will include placement information for the elements of the circuit design. If one of the candidate locations is not already assigned to another element of the circuit design, then at block 408, the system instantiates a delay circuit at the available candidate location and specifies connections between the driver, the load, and the delay circuit. If none of the candidate locations are available, then at block 414, the system performs a spiral search, spiraling in towards or spiraling out from one or more of the candidate locations, to generate spiral candidate locations.

At block 416, the system determines whether or not any one of the spiral candidate locations is available. If one of the spiral candidate locations is available, then at block 408, the system instantiates a delay circuit at the available spiral candidate location and specifies connections between the driver, the load, and the delay circuit.

In a spiraling in search, at block 416, the availability of a starting candidate location, such as candidate location 314, is determined. If the starting candidate location is available, then a delay circuit is instantiated at the starting candidate location. If the starting candidate location is unavailable, then another spiral candidate location is generated by offsetting the starting candidate location in the x, y, or a combination of the x and y directions along a spiral path, such as rectilinear spiral path 316. The offset can be different from the offset of the original candidate location that generated the starting spiral candidate location. The offsets can be repeated until the original candidate location, such as candidate location 312-3, is reached.

In a spiraling out search, at block 416, the availability of a spiral candidate location, offset in the x, y, or a combination of the x and y directions from a candidate location, such as candidate location 312-3, along a spiral path, such as rectilinear spiral path 316, is determined. If the spiral candidate location is available, then a delay circuit is instantiated at the spiral candidate location. If the spiral candidate location is unavailable, then another spiral candidate location is generated by offsetting the previous spiral candidate along the spiral path. An ending candidate location, such as candidate location 314, can be selected at which the spiral path terminates. The ending candidate location has placement coordinates separated from candidate location 312-3 by another offset. The spiraling out search can continue until the availability of a threshold quantity of spiral candidate locations are determined, a threshold length of the spiral path is exceeded, and/or the ending candidate location is reached.

In response to determining that all spiral candidate locations on a respective spiral path are unavailable, then the availability of another candidate location, such as candidate location 312-4, or spiral candidate locations along a spiral path beginning or ending with the other candidate location is determined.

If none of the candidate locations and none of the spiral candidate locations are available, then at block 420, the system determines larger offsets from the locations on the perimeter of the rectangular region and generate new candidate locations. The horizontal offset $Dist_X$ and vertical offset $Dist_Y$ are based on an offset factor f, the delay d, and the unit delay in the x direction or the y direction, respectively. An initial value of the offset factor f is used to determine a first set of candidate locations, such as candidate locations 212. If all of the first set of candidate locations are unavailable, then the value of the offset factor f is increased to determine a second set of candidate locations. For example, the value of the offset factor f can be ½ to generate candidate locations 212 and then increased to ⅔ to generate a second set of candidate locations. If all of the second set of candidate locations are unavailable, then the value of the offset factor f is increased until an available candidate location or spiral candidate location is determined or a maximum value of the offset factor f is used.

At block 422, the system determines whether or not any one of the new candidate locations is available. If one of the new candidate locations (e.g., one of the second set of candidate locations) is available, then at block 408, the system instantiates a delay circuit at the available new candidate location and specifies connections between the driver, the load, and the delay circuit.

In at least one implementation, if the delay circuit is instantiated at the candidate location at block 408 and the hold violation persists, another delay circuit can be instantiated at another candidate location. The other candidate location can be determined by increasing the offset factor f, because the unit delay approximation may not account for delays for some areas of an IC die. The processing of blocks 402, 404, 406, 408, 414, 416, 420, and 422 can be repeated using the increased offset factor f. If none of the spiral candidate locations are available, and a maximum value of the offset factor f has been attempted, the process can terminate and/or issue an error message indicating that no candidate location is available.

If none of the new candidate locations are available at block 422, then at block 414, the system performs a spiral search, spiraling in towards or spiraling out from one or more of the new candidate locations (e.g., spiraling in towards or spiraling out from the second set of candidate locations), to generate new spiral candidate locations.

Subsequent to instantiating the delay circuit, at block 410, configuration data is generated from the circuit design with the instantiated delay circuit. For example, place-and-route and bitstream generation tools may be executed to generate configuration data for manufacturing an application-specific integrated circuit (ASIC) or for programming an FPGA. At block 412, a circuit can be made from the configuration data. The configuration data can be used to manufacture an ASIC or configure a programmable integrated circuit having FPGA circuitry.

The disclosed systems and methods can significantly reduce the number of delay circuits inserted in a circuit design to resolve hold violations. For example, tests have shown reductions ranging from 34% to 82% in the number of delay circuits required to close timing of a circuit design as compared to previous approaches.

Figure 5:
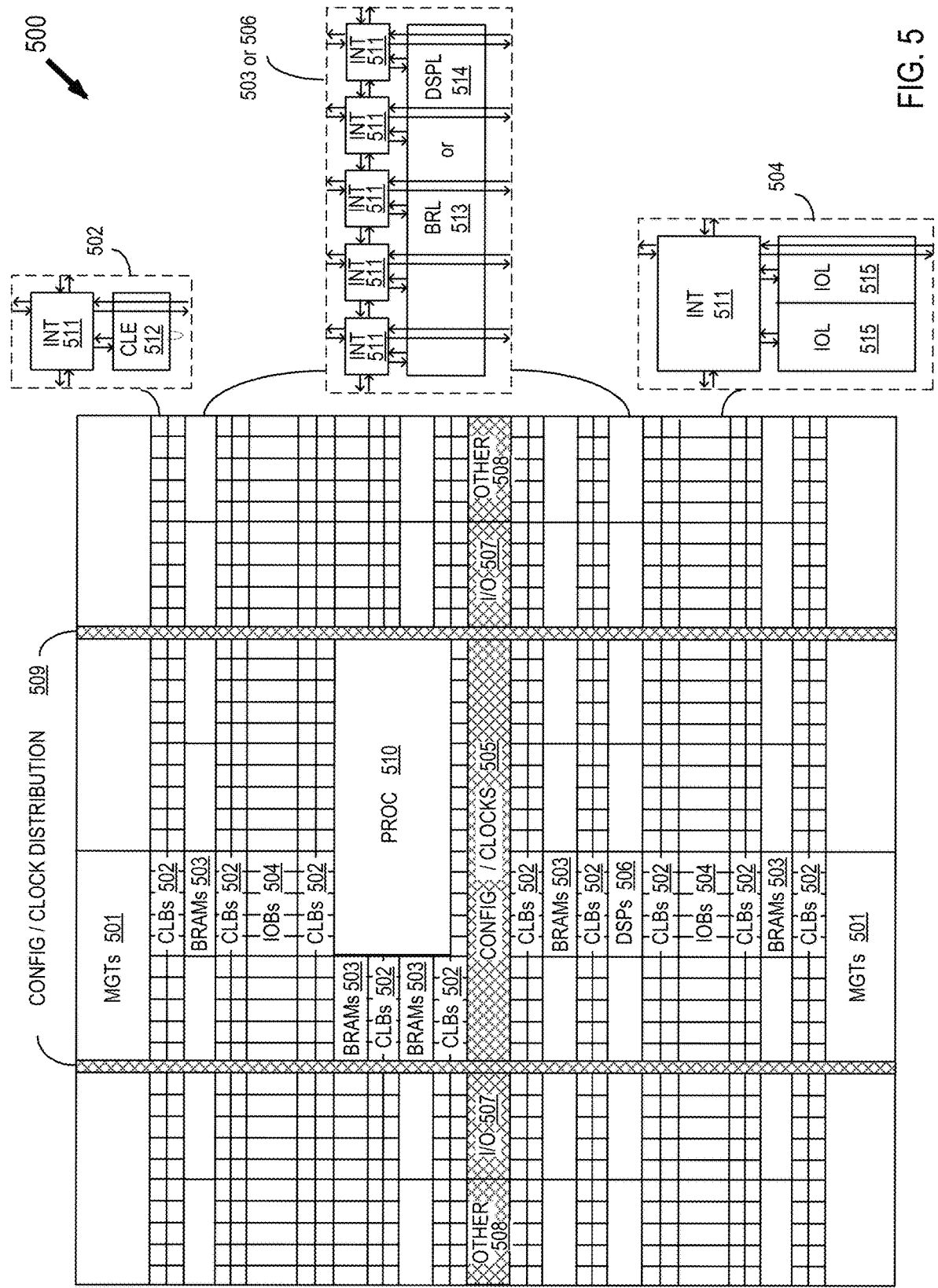
FIG. 5 illustrates a programmable integrated circuit (IC) on which the disclosed circuits and processes may be implemented.

FIG. 5 illustrates a programmable integrated circuit (IC) 500 on which a circuit design processed according to the disclosed methods and systems can be implemented. The programmable IC may also be referred to as a System On Chip (SOC) that includes field programmable gate array logic (FPGA) along with other programmable resources. FPGA logic may include several different types of programmable logic blocks in the array. For example, FIG. 5 illustrates programmable IC 500 that includes a large number of different programmable tiles including multi-gigabit transceivers (MGTs) 501, configurable logic blocks (CLBs) 502, random access memory blocks (BRAMs) 503, input/output blocks (IOBs) 504, configuration and clocking logic (CONFIG/CLOCKS) 505, digital signal processing blocks (DSPs) 506, specialized input/output blocks (I/O) 507, for example, clock ports, and other programmable logic 508 such as digital clock managers, analog-to-digital converters, system monitoring logic, and so forth. Some programmable IC having FPGA logic also include dedicated processor blocks (PROC) 510 and internal and external reconfiguration ports (not shown).

In some FPGA logic, each programmable tile includes a programmable interconnect element (INT) 511 having standardized connections to and from a corresponding interconnect element in each adjacent tile. Therefore, the programmable interconnect elements taken together implement the programmable interconnect structure for the illustrated FPGA logic. The programmable interconnect element INT 511 also includes the connections to and from the programmable logic element within the same tile, as shown by the examples included at the top of FIG. 5.

For example, a CLB 502 can include a configurable logic element (CLE) 512 that can be programmed to implement user logic, plus a single INT 511. A BRAM 503 can include a BRAM logic element (BRL) 513 in addition to one or more programmable interconnect elements. Typically, the number of interconnect elements included in a tile depends on the height of the tile. In the pictured programmable IC, a BRAM tile has the same height as five CLBs, but other numbers (e.g., four) can also be used. A DSP tile 506 can include a DSP logic element (DSPL) 514 in addition to an appropriate number of programmable interconnect elements. An IOB 504 can include, for example, two instances of an input/output logic element (IOL) 515 in addition to one instance of the INT 511. As will be clear to those of skill in the art, the actual I/O bond pads connected, for example, to the IOL 515, are manufactured using metal layered above the various illustrated logic blocks, and typically are not confined to the area of the input/output logic element 515.

In the pictured programmable IC, a columnar area near the center of the die (shown shaded in FIG. 5) is used for configuration, clock, and other control logic. Horizontal areas 509 extending from this column are used to distribute the clocks and configuration signals across the breadth of the programmable IC. Note that the references to "columnar" and "horizontal" areas are relative to viewing the drawing in a portrait orientation.

Some programmable ICs utilizing the architecture illustrated in FIG. 5 include additional logic blocks that disrupt the regular columnar structure making up a large part of the programmable IC. The additional logic blocks can be programmable blocks and/or dedicated logic. For example, the processor block PROC 510 shown in FIG. 5 spans several columns of CLBs and BRAMs.

Note that FIG. 5 is intended to illustrate only an exemplary programmable IC architecture. The numbers of logic blocks in a column, the relative widths of the columns, the number and order of columns, the types of logic blocks included in the columns, the relative sizes of the logic blocks, and the interconnect/logic implementations included at the top of FIG. 5 are purely exemplary. For example, in an actual programmable IC, more than one adjacent column of CLBs is typically included wherever the CLBs appear, to facilitate the efficient implementation of user logic.

Figure 6:
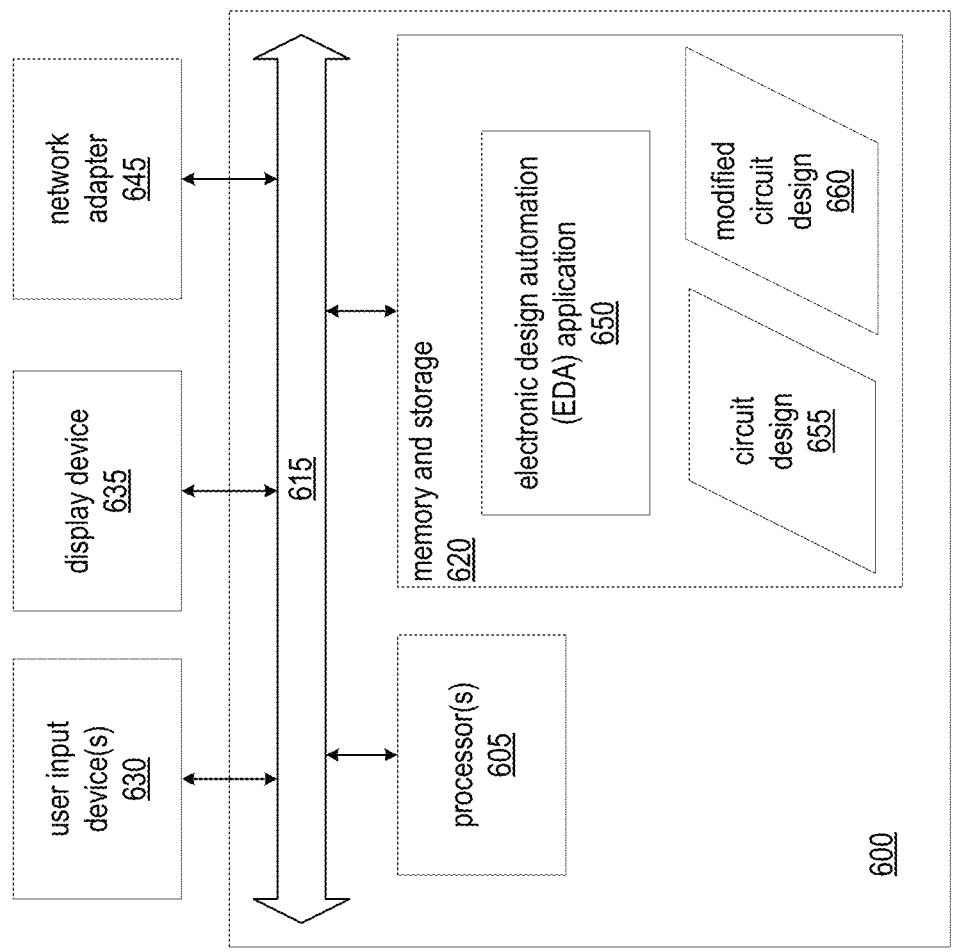
FIG. 6 illustrates a block diagram illustrating an exemplary data processing system.

FIG. 6 illustrates a block diagram illustrating an exemplary data processing system (system) 600. System 600 is an example of an EDA system. As pictured, system 600 includes at least one processor circuit (or "processor"), e.g., a central processing unit (CPU) 605 coupled to memory and storage arrangement 620 through a system bus 615 or other suitable circuitry. System 600 stores program code and circuit design 655 within memory and storage arrangement 620. Processor 605 executes the program code accessed from the memory and storage arrangement 620 via system bus 615. In one aspect, system 600 is implemented as a computer or other data processing system that is suitable for storing and/or executing program code. It should be appreciated, however, that system 600 can be implemented in the form of any system including a processor and memory that is capable of performing the functions described within this disclosure.

Memory and storage arrangement 620 includes one or more physical memory devices such as, for example, a local memory (not shown) and a persistent storage device (not shown). Local memory refers to random access memory or other non-persistent memory device(s) generally used during actual execution of the program code. Persistent storage can be implemented as a hard disk drive (HDD), a solid state drive (SSD), or other persistent data storage device. System 600 may also include one or more cache memories (not shown) that provide temporary storage of at least some program code and data in order to reduce the number of times program code and data must be retrieved from local memory and persistent storage during execution.

Input/output (I/O) devices such as user input device(s) 630 and a display device 635 may be optionally coupled to system 600. The I/O devices may be coupled to system 600 either directly or through intervening I/O controllers. A network adapter 645 also can be coupled to system 600 in order to couple system 600 to other systems, computer systems, remote printers, and/or remote storage devices through intervening private or public networks. Modems, cable modems, Ethernet cards, and wireless transceivers are examples of different types of network adapter 645 that can be used with system 600.

Memory and storage arrangement 620 may store an EDA application 650. EDA application 650, being implemented in the form of executable program code, is executed by processor(s) 605. As such, EDA application 650 is considered part of system 600. System 600, while executing EDA application 650, receives and operates on circuit design 655. In one aspect, system 600 performs a design flow on circuit design 655, and the design flow may include synthesis, mapping, placement, routing, and the application of the methods described herein. System 600 generates an optimized, or modified, version of circuit design 655 as circuit design 660. Circuit design 655 may have hold violations and does not include delay circuits instantiated at candidate locations, whereas circuit design 660 includes delay circuits instantiated at candidate location to fix the hold violations.

EDA application 650, circuit design 655, circuit design 660, and any data items used, generated, and/or operated upon by EDA application 650 are functional data structures that impart functionality when employed as part of system 600 or when such elements, including derivations and/or modifications thereof, are loaded into an IC such as a programmable IC causing implementation and/or configuration of a circuit design within the programmable IC.

Though aspects and features may in some cases be described in individual figures, it will be appreciated that features from one figure can be combined with features of another figure even though the combination is not explicitly shown or explicitly described as a combination.

The disclosed methods and system are thought to be applicable to a variety of systems for preparing and/or maintaining circuit designs. Other aspects and features will be apparent to those skilled in the art from consideration of the specification. It is intended that the specification and drawings be considered as examples only, with a true scope of the invention being indicated by the following claims.

What is claimed is:

1. A computer-implemented method of processing a circuit design, comprising:
performing operations on a processor including:
identifying a driver and a load having a hold violation in the circuit design, wherein the circuit design is targeted to an integrated circuit (IC) die;
determining a first offset from a location on a perimeter of a rectangular region of the IC die having corners at locations of the driver and the load such that a length of a signal path from the driver through a first candidate location having placement coordinates that are outside the rectangular region, on or outside an ellipse that surrounds the rectangular region, and at the first offset from the location on the perimeter resolves the hold violation;
determining availability of the first candidate location; and
in response to the determining that the first candidate location is available:
instantiating a delay circuit at the first candidate location in the circuit design; and
specifying connections that connect the delay circuit between the driver and the load in the circuit design.

2. The method of claim 1, wherein determining the first offset includes determining the first offset such that a rectilinear length of the signal path from the driver through the first candidate location to the load resolves the hold violation.

3. The method of claim 1, wherein determining the first offset includes determining an offset along an x-axis from a corner of the rectangular region.

4. The method of claim 1, wherein determining the first offset includes determining an offset along a y-axis from a corner of the rectangular region.

5. The method of claim 1, wherein determining the first offset includes multiplying a unit delay of the IC die by an offset factor.

6. The method of claim 5, further comprising:
determining, in response to the determining that the first candidate location is unavailable, a second offset from the location on the perimeter of the rectangular region such that the length of the signal path from the driver through a second candidate location having placement coordinates that are outside the rectangular region and at the second offset from the location on the perimeter resolves the hold violation,
wherein the second offset is a product of the unit delay of the IC die and another offset factor.

7. The method of claim 1, further comprising:
in response to the determining that the first candidate location is unavailable:
determining a second offset from the first candidate location;
selecting a starting candidate location having placement coordinates separated from the first candidate location by the second offset;
determining availability of one or more second candidate locations having placement coordinates along a rectilinear spiral path that begins at the starting candidate location and ends at the first candidate location; and
in response to the determining that one of the one or more second candidate locations is available, instantiating the delay circuit at the one of the one or more second candidate locations.

8. The method of claim 1, further comprising:
in response to the determining that the first candidate location is unavailable:
determining a second offset from the first candidate location;
selecting an ending candidate location having placement coordinates separated from the first candidate location by the second offset;
determining availability of one or more second candidate locations having placement coordinates along a rectilinear spiral path that begins at the first candidate location and ends at the ending candidate location; and
in response to the determining that one of the one or more second candidate locations is available, instantiating the delay circuit at the one of the one or more second candidate locations.

9. The method of claim 1, wherein determining the first offset includes determining the first offset such that the length of the signal path from the driver through a single delay circuit at the first candidate location to the load resolves the hold violation.

10. The method of claim 1, further comprising:
generating configuration data from the circuit design; and
making an integrated circuit from the configuration data.

11. A system, comprising:
a computer system including:
a processor; and
a memory configured with instructions that when executed by the processor cause the processor to perform operations including:
identifying a driver and a load having a hold violation in a circuit design, wherein the circuit design is targeted to an integrated circuit (IC) die;
determining a first offset from a location on a perimeter of a rectangular region of the IC die having corners at locations of the driver and the load such that a length of a signal path from the driver through a first candidate location having placement coordinates that are outside the rectangular region on or outside an ellipse that surrounds the rectangular region, and at the first offset from the location on the perimeter resolves the hold violation;
determining availability of the first candidate location; and
in response to determining that the first candidate location is available:
instantiating a delay circuit at the first candidate location in the circuit design; and
specifying connections that connect the delay circuit between the driver and the load in the circuit design.

12. The system of claim 11, wherein the memory is configured with instructions that when executed by the processor cause the processor to determine the first offset such that a rectilinear length of the signal path from the driver through the first candidate location to the load resolves the hold violation.

13. The system of claim 11, wherein the memory is configured with instructions that when executed by the processor cause the processor to determining the first offset by determining an offset along an x-axis from a corner of the rectangular region.

14. The system of claim 11, wherein the memory is configured with instructions that when executed by the processor cause the processor to determine the first offset by determining an offset along a y-axis from a corner of the rectangular region.

15. The system of claim 11, wherein the memory is configured with instructions that when executed by the processor cause the processor to determine the first offset by multiplying a unit delay of the IC die by an offset factor.

16. The system of claim 15, wherein the memory is further configured with instructions that when executed by the processor cause the processor to:
  determine, in response to determining that the first candidate location is unavailable, a second offset from the location on the perimeter of the rectangular region such that the length of the signal path from the driver through a second candidate location having placement coordinates that are outside the rectangular region and at the second offset from the location on the perimeter resolves the hold violation,
  wherein the second offset is a product of the unit delay of the IC die and another offset factor.

17. The system of claim 11, wherein the memory is further configured with instructions that when executed by the processor cause the processor to:
  in response to determining that the first candidate location is unavailable:
    determine a second offset from the first candidate location;
    select a starting candidate location having placement coordinates separated from the first candidate location by the second offset;
    determine availability of one or more second candidate locations having placement coordinates along a rectilinear spiral path that begins at the starting candidate location and ends at the first candidate location; and
  in response to determining that one of the one or more second candidate locations is available, instantiate the delay circuit at the one of the one or more second candidate locations.

18. The system of claim 11, wherein the memory is further configured with instructions that when executed by the processor cause the processor to:
  in response to determining that the first candidate location is unavailable:
    determine a second offset from the first candidate location;
    select an ending candidate location having placement coordinates separated from the first candidate location by the second offset;
    determine availability of one or more second candidate locations having placement coordinates along a rectilinear spiral path that begins at the first candidate location and ends at the ending candidate location; and
  in response to determining that one of the one or more second candidate locations is available, instantiate the delay circuit at the one of the one or more second candidate locations.

19. The system of claim 11, wherein the memory is configured with instructions that when executed by the processor cause the processor to determine the first offset by determining the first offset such that the length of the signal path from the driver through a single delay circuit at the first candidate location to the load resolves the hold violation.

20. The system of claim 11, wherein the memory is further configured with instructions that when executed by the processor cause the processor to:
  generate configuration data from the circuit design; and
  make an integrated circuit from the configuration data.

* * * * *